US012811499B2

(12) United States Patent
Yu et al.

(10) Patent No.: US 12,811,499 B2
(45) Date of Patent: Nov. 24, 2026

(54) VOLTAGE WAVEFORM GENERATOR FOR ION ENERGY CONTROL IN PLASMA PROCESSING

(71) Applicant: PRODRIVE TECHNOLOGIES INNOVATION SERVICES B.V., Son en Breugel (NL)

(72) Inventors: Qihao Yu, Son en Breugel (NL); Erik Lemmen, Son en Breugel (NL); Bastiaan Joannes Daniël Vermulst, Son en Breugel (NL)

(73) Assignee: PRODRIVE TECHNOLOGIES INNOVATION SERVICES B.V., Son en Breugel (NL)

( * ) Notice: Subject to any disclaimer, the term of this patent is extended or adjusted under 35 U.S.C. 154(b) by 8 days.

(21) Appl. No.: 19/127,682

(22) PCT Filed: Nov. 16, 2023

(86) PCT No.: PCT/EP2023/082128
§ 371 (c)(1),
(2) Date: May 6, 2025

(87) PCT Pub. No.: WO2024/105200
PCT Pub. Date: May 23, 2024

(65) Prior Publication Data

US 2026/0180441 A1 Jun. 25, 2026

(30) Foreign Application Priority Data

Nov. 18, 2022 (NL) ...................................... 2033565

(51) Int. Cl.
*H02M 3/156* (2006.01)
*H02M 3/158* (2006.01)
(Continued)

(52) U.S. Cl.
CPC ........... *H02M 3/156* (2013.01); *H02M 3/158* (2013.01); *H02M 3/33592* (2013.01); *H02M 7/483* (2013.01)

(58) Field of Classification Search
CPC .. H02M 3/156; H02M 3/158; H02M 3/33592; H02M 7/483; H01J 37/321;
(Continued)

(56) References Cited

U.S. PATENT DOCUMENTS 9,208,992 B2 * 12/2015 Brouk .................. C23C 14/345
2010/0072172 A1 * 3/2010 Ui ..................... H01J 37/32009 156/345.48
(Continued)

FOREIGN PATENT DOCUMENTS

WO WO2020216741 A1 10/2020
WO WO2022013017 A1 1/2022
WO WO2022013018 A1 1/2022

OTHER PUBLICATIONS

International Search Report and Written Opinion of the International Searching Authority from the European Patent Office, in PCT/EP2023/082128 dated Feb. 15, 2024, of which this application is a national phase entry.
(Continued)

*Primary Examiner* — Thai Pham
(74) *Attorney, Agent, or Firm* — Kolitch Romano Dascenzo Gates LLP

(57) ABSTRACT

A voltage waveform generator for a plasma assisted processing apparatus may include an output node, a switch node electrically coupled to the output node, and a multilevel voltage source converter coupled to the switch node. The multilevel voltage source converter is configured to apply a sequence of monotonically descending voltage levels at the switch node, each of the voltage levels being applied for a respective predetermined time period such that a pitch
(Continued)

defined by the voltage levels and the respective predetermined time periods corresponds with a negative voltage slope of a portion of a tailored voltage waveform at the output node. The tailored voltage waveform controls an ion energy on an exposed surface of a substrate processed by plasma generated ions. The multilevel voltage source converter includes a T-type converter in series with at least one H-bridge cell.

20 Claims, 11 Drawing Sheets

(51) Int. Cl.
*H02M 3/335* (2006.01)
*H02M 7/483* (2007.01)

(58) Field of Classification Search
CPC .......... H01J 37/32128; H01J 37/32706; H01J 37/32577; H01J 37/32174; H01J 37/32146
See application file for complete search history.

(56) References Cited

U.S. PATENT DOCUMENTS

| | | | | |
|---|---|---|---|---|
| 2015/0144596 | A1* | 5/2015 | Brouk | C23C 14/345 427/569 |
| 2018/0032100 | A1* | 2/2018 | Kim | H03K 3/021 |
| 2019/0172685 | A1 | 6/2019 | Van Zyl | |
| 2020/0203128 | A1 | 6/2020 | Fairbairn | |
| 2021/0152100 | A1* | 5/2021 | Zilio | H02M 7/4837 |
| 2023/0245855 | A1* | 8/2023 | Everts | H01J 37/32146 315/111.21 |
| 2023/0260753 | A1* | 8/2023 | Everts | H01J 37/32128 315/111.21 |
| 2024/0136945 | A1* | 4/2024 | Danilovic | H02M 7/4837 |

OTHER PUBLICATIONS

Yu, Hanyang, et al., "Hybrid Seven-Level Converter Based on T-Type Converter and H-Bridge Cascaded Under SPWM and SVM", Jan. 2018.

Yu, Qihao, et al., "Accurate Ion Energy Control in Plasma Processing by Switched-Mode Power Converter", International Power Electronics Conference 2022.

* cited by examiner

VOLTAGE WAVEFORM GENERATOR FOR ION ENERGY CONTROL IN PLASMA PROCESSING

TECHNICAL FIELD

The present disclosure is related to a voltage waveform generator for controlling ion energy in plasma assisted processes and to a related method for doing so.

BACKGROUND

Plasma etching and deposition are two crucial processes in semiconductor manufacturing. With the feature size of the integrated circuits continuing to shrink, the accuracy of the plasma processing becomes more and more critical, especially in atomic scale processing, including atomic layer etching (ALE) and atomic layer deposition (ALD). One of the rising demands is to obtain a single-peak and narrow plasma ion energy distribution (IED), which is beneficial to the processing selectivity.

In plasma assisted processing, plasma ions are accelerated and are made to bombard the substrate surface. A narrow IED requires a quasi-constant voltage potential on the substrate surface. In both multi-frequency capacitively coupled plasma and inductively coupled plasma, ion energy can be controlled by biasing the substrate surface with specific voltage waveforms. For a conductive substrate, a dc voltage can be applied to keep the voltage potential on the substrate surface constant. For a dielectric substrate, radio-frequency waveforms are the most typical biasing waveforms, which normally lead to wide and bimodal ion energy distribution. Recently, tailored waveforms have been found effective to precisely control the ion energy and generate a concentrated and single-peak IED in a wide range of applications.

The tailored waveform consists of a possibly linearly decreasing voltage slope and a positive voltage pulse. The voltage slope is used to compensate the charge effect of the bombarding ions on the dielectric substrate. A dielectric substrate can be considered to be equivalent to a capacitance. The equivalent current introduced by the bombarding ions charges the substrate capacitance. By linearly decreasing the voltage potential on the bottom side of the substrate (i.e., the side opposite to the exposed surface), the voltage potential on the substrate surface can be kept constant. Since the voltage over the substrate increases in the process, a voltage pulse is applied periodically to attract electrons and discharge the capacitance, thus preventing over voltage.

The tailored waveforms can be delivered by both linear amplifiers and switched-mode power converters (SMPCs). The repetition frequency of the tailored waveforms can range from several kHz to several MHz. Typically, linear amplifiers have much higher bandwidth than SMPCs. With an impedance matching network, linear amplifiers can generate the required high repetition-frequency tailored voltage waveforms. For SMPCs, both a voltage source converter and a hybrid converter including a voltage source and a current source have been proposed. The bandwidth of a voltage source converter is typically not sufficient to deliver the required voltage slope accurately at high repetition frequency.

WO 2022/013017 A1 discloses such a hybrid converter. A multilevel voltage source converter is configured to generate the required voltage pulses of controllable magnitudes. During the rise and fall of the desired pulse, multiple different voltage levels can be applied to suppress resonance and generate a smooth waveform, with the aid of a small pulse inductance. The negative voltage slope is generated by a current source converter formed by an inductor in series with a half-bridge voltage source converter. The half-bridge voltage source converter is switched to maintain a voltage across the inductor balanced in steady state.

This kind of hybrid converter generally works well for tailored voltage waveforms having a magnitude that is not excessively high. Indeed, to obtain a narrow IED, the output current of the current source converter should be as constant as possible, which requires a very small inductor current ripple. This can be realized by low inductor voltage ripples or by using a very large inductance. Firstly, when the magnitude of the tailored voltage waveform is increased, the difference between the voltage levels of the half-bridge voltage source converter need to be increased to be able to balance the inductor voltage. This however increases the voltage ripple over the inductor and consequently increases the inductor current ripple. Secondly, a larger inductance normally leads to a larger parasitic capacitance and hence a lower self-resonant frequency. This limits the repetition frequency of the tailored waveforms that can be generated.

SUMMARY

There is therefore a need to be able to generate tailored voltage waveforms with higher magnitude and/or repetition frequency, while maintaining a high accuracy, specifically as regards the negative voltage slope that defines the IED.

According to a first aspect of the present disclosure, there is therefore provided a voltage waveform generator. A voltage waveform generator according to the present disclosure is configured for use with a plasma assisted processing apparatus. The voltage waveform generator can be an electrical power converter, and comprises an output node, a switch node electrically coupled to the output node and a multilevel voltage source converter coupled to the switch node. An output of the multilevel voltage source converter is available at the switch node. Particularly, the multilevel voltage source converter is configured to apply a plurality of different voltage levels, which may be fixed or variable, at the switch node.

The voltage waveform generator is configured to generate a tailored voltage waveform at the output node, wherein the tailored voltage waveform is suitable for controlling an ion energy on an exposed surface of a substrate processed by plasma generated ions. The tailored voltage waveform comprises a first portion having a negative voltage slope (i.e. a monotonically decreasing voltage level) and can further comprise second portion consisting of a positive voltage pulse. The first portion and the second portion can alternate, and the tailored voltage waveform can be periodic. The first portion is configured to maintain a constant voltage potential at an exposed surface of a substrate while the surface is bombarded by ions.

According to an aspect, the multilevel voltage source converter is configured to apply a sequence of monotonically descending voltage levels at the switch node, each of the voltage levels being applied for a respective predetermined time period, which can be constant or variable. Particularly, a pitch (or gradient) defined by the monotonically descending voltage levels and the respective predetermined time periods corresponds with the negative voltage slope (or gradient) of the first portion of the tailored waveform. As a result, the first portion of the tailored voltage waveform can be obtained at the output node in an accurate manner.

Hence, according to the present disclosure, a voltage waveform generator for controlling an ion energy impinging on a substrate to be processed in a plasma assisted processing apparatus is configured to obtain the negative voltage slope of the tailored voltage waveform through a multilevel voltage source converter that is configured to generate a sequence of monotonically descending (stepped) voltage levels that sufficiently approximate the negative voltage slope. Particularly, a pitch of the stepped sequence, referring to a ratio between the voltage level and the time period over which the voltage level is applied, corresponds with or defines the negative voltage slope or gradient. By so doing, advantageously a current source converter as utilized in prior art voltage waveform generators can be dispensed with and voltage waveform generators according to the present disclosure advantageously do not comprise current source converters configured to generate the negative voltage slope by sinking current. Such current source converters would typically comprise large inductors to stabilize the current, and these bulky and costly elements can be dispensed with. Furthermore, utilizing a multilevel voltage source converter to define and generate the portion having the negative voltage slope of the tailored voltage waveform without utilizing a current source advantageously allows to increase the repetition frequency and/or voltage magnitudes of the tailored voltage waveform while still maintaining desired accuracy.

The negative voltage slope can be constant or variable, and so can be the pitch of the stepped sequence. Hence, it is possible to easily adapt the tailored voltage waveform according to process needs in a flexible manner by controlling the voltage levels and/or the predetermined time periods of the stepped sequence. Advantageously, the negative voltage slope is constant and the pitch is constant across the sequence of monotonically descending voltage levels. Advantageously, the multilevel voltage source converter is configured to output a plurality of different voltage levels being integer multiples of a voltage step, such that a difference between consecutive voltage levels of the sequence of monotonically descending voltage levels is constant and equal to the voltage step. Advantageously, the respective predetermined time periods are identical throughout the sequence.

Advantageously, the multilevel voltage source converter is configured to have at least three different voltage levels. Advantageously, the multilevel voltage source converter is a switched mode power converter configured to have redundant switching states to obtain the at least three voltage levels. One benefit is that non-isolated DC/DC converters can be used instead of more expensive isolated DC/DC converters. Furthermore, common-mode interference which would be added by the isolated DC/DC converters can be avoided. Additionally, a plurality of DC-link capacitors corresponding with at least part of the at least three voltage levels can be utilized.

A further advantage is that now both the positive voltage pulse and the negative voltage slope parts of the tailored voltage waveform can be generated through a same kind of multilevel voltage source converter, which can reduce complexity and cost of the voltage waveform generator.

According to an aspect, the multilevel voltage source converter comprises a T-type converter in series with at least one H-bridge cell. One advantage of such a multilevel voltage source converter is that a number of (intermediate) voltage levels can be obtained which is higher than the number of submodules (i.e., the T-type converter and the number of H-bridge cells). As a result, a more accurate staircase-stepped voltage waveform can be obtained with reduced hardware components. In addition, through these larger number of intermediate voltage levels, smaller voltage steps can be applied enabling the voltage at the load to converge more rapidly to the target value by LC resonance.

The T-type converter can comprise at least one, advantageously two non-isolated DC voltage sources configured to have same, or advantageously different voltage levels, particularly voltage levels not being an integer multiple of one another. This enables the multilevel voltage source converter to advantageously generate the voltage pulse portion of the tailored voltage waveform, in addition to the negative voltage slope portion, and/or to balance the DC-link capacitors of the at least one H-bridge cell, if provided with such a DC-link capacitor.

The multilevel voltage source converter advantageously comprises a plurality of H-bridge cells cascaded in series between the T-type converter and the output. Each H-bridge cell comprises a DC-link voltage supply. The DC-link voltage supply of any one or all of the H-bridge cells can comprise or consist of a DC-link capacitor, a non-isolated DC-voltage source or an isolated DC-voltage source, with the DC-link capacitor having the benefit of simpler hardware design although it requires increased control effort due to required voltage balancing.

Advantageously, the voltage waveform generator is further configured to process the sequence of monotonically descending voltage levels applied at the switch node and apply the processed sequence at the output node, in which the processed sequence conforms to at least a portion of the tailored voltage waveform, particularly to the decreasing voltage slope part of the tailored voltage waveform. Voltage processing operations between the switch node and the output node can comprise or consist of one or a combination of filtering, voltage clamping, offsetting and dampening. To this end, the voltage waveform generator advantageously comprises one or more of a filter inductor, a blocking capacitor and a dampening element such as a resistor connected in series between the switch node and the output node.

Advantageously, the voltage waveform generator comprises a clamping node connected between the switch node and the output node. A voltage clamping circuit is advantageously connected to the clamping node. The voltage clamping circuit is configured to clamp a maximum voltage and/or a minimum voltage at the clamping node. This allows to limit the voltage applied at the output node to a maximum level and/or a minimum level. Advantageously the voltage clamping circuit comprises a blocking diode connected in series to a voltage level of the multilevel voltage source converter. By so doing, a voltage source can be shared between the clamping circuit and the multilevel voltage source converter reducing circuit complexity and cost.

According to a second aspect of the disclosure, an apparatus for plasma assisted processing of a substrate, particularly a dielectric substrate, is provided. Particularly, the apparatus is configured to process the substrate with ions generated by means of a plasma. Such apparatus comprises the voltage waveform generator according to the present disclosure to control an ion energy at an exposed surface of the substrate.

According to a third aspect of the present disclosure, there is provided a method of generating a tailored waveform as set out in the appended claims. Methods according to the present disclosure comprise applying a sequence of monotonically descending voltage levels to a switch node, each voltage level being applied for a respective predetermined time period such that the voltage levels and the respective predetermined time periods define a pitch corresponding with the negative voltage slope of a first portion of the tailored waveform. The switch node is electrically coupled to an output node to obtain the first portion of the tailored voltage waveform. To this end, the sequence can be suitably processed between the switch node and the output node. By so doing, tailored waveforms with accurately controllable magnitude, slope rate and frequency are advantageously obtained. By adjusting the tailored voltage waveforms, the desired ion energy can be obtained. The voltage waveform generator according to the first aspect, or the apparatus according to the second aspect can be configured to carry out the method according to the third aspect, e.g. by implementing in a controller.

According to a fourth aspect of the present disclosure, there is provided a method of processing a substrate, particularly a dielectric substrate, through ions generated by means of a plasma, as set out in the appended claims. Such methods are referred to as plasma assisted processing of the substrate. The method comprises generating a tailored voltage waveform according to the third aspect of the present disclosure and applying the tailored voltage waveform to a processing table on which the substrate is disposed. The first portion of the tailored voltage waveform is applied while ions are made to impinge on an exposed surface of the substrate such that a voltage potential on the exposed surface can be maintained constant, thereby allowing to obtain a narrow IED. The ions are generated through a plasma which is excited and sustained by an external power supply, possibly through a matching network. The apparatus according to the second aspect can be configured to carry out the method according to the fourth aspect, e.g. by implementing in a controller.

BRIEF DESCRIPTION OF THE DRAWINGS

Aspects of the present disclosure will now be described in more detail with reference to the appended drawings, wherein same reference numerals illustrate same features and wherein.

DETAILED DESCRIPTION

Figure 1:
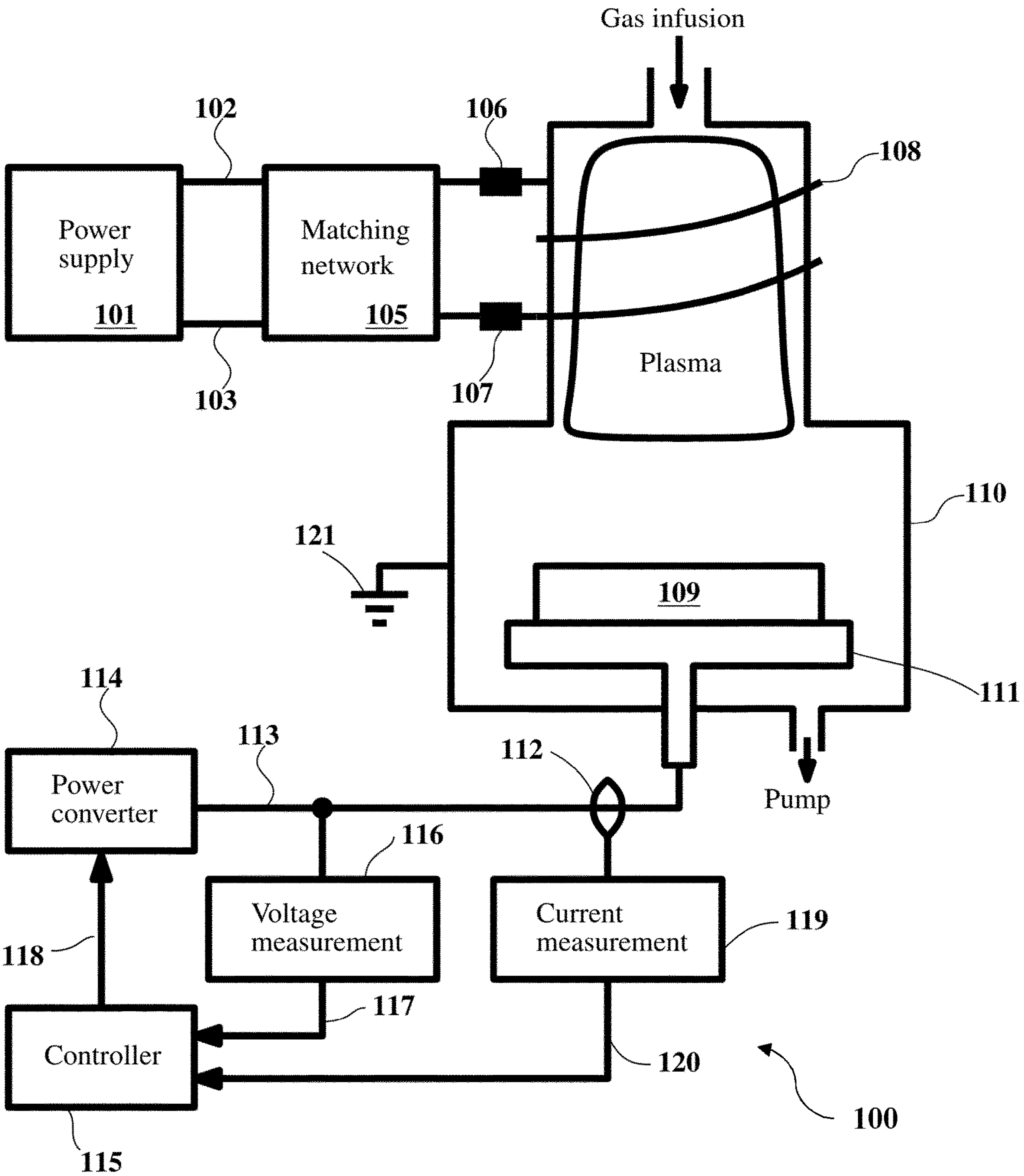
FIG. 1 represents a block diagram of an exemplary apparatus for plasma assisted processing.

An apparatus 100 for plasma processing a dielectric substrate, such as a semiconductor substrate, is shown in FIG. 1. Gas is infused to the reactor 110. The reactor wall is grounded to protective earth (PE) 121. The plasma is ignited in the reactor 110 with an external power supply 101, which is coupled with the gas by a matching network 105 coupled to a coil 108 arranged externally of the reactor 110. The power supply is connected to the matching network 105 with two connection leads 102, 103 and the matching network 105 is connected to the coil 108 by two connectors 106 and 107. The power supply 101 can be any suitable power source including radio-frequency (RF), microwave-frequency (MF) and pulsed DC power sources. Although the plasma source as shown in FIG. 1 is inductively coupled, it can be of any other variety, such as capacitively coupled plasma source and helicon type plasma source.

The apparatus 100 can be used for plasma etching or plasma deposition. Therefore, a dielectric substrate material 109 is placed on the table 111 inside the reactor 110. The pressure in the reactor is kept low (i.e. below atmospheric pressure, such as a partial vacuum) by a (vacuum) pump depicted in FIG. 1.

A power converter 114 is connected to the table 111 through electrical connection 113. The power converter 114 is configured to output a tailored voltage waveform aiming at controlling the IED, as described in the present disclosure. In the present disclosure, the terms 'power converter' and 'voltage waveform generator' will hence be used interchangeably. It will be appreciated that the voltage waveform generator can comprise additional circuitry and measurement units allowing to control an output of the power converter 114 as detailed below.

A voltage measurement unit 116 can be connected to the power converter 114, measuring the output voltage of the power converter 114. The voltage measurement unit 116 is coupled to controller 115 through (data) connection 117 for sending measured results to the controller 115.

A current measurement unit 119 can be provided to measure the output current of the power converter 114, e.g. through an interface 112 connected to electrical connection 113 and/or table 111. The current measurement unit 119 is coupled to controller 115 through (data) connection 120 for sending measured results to the controller 115.

The controller 115 implements a voltage waveform control algorithm and is configured to control the power converter 114 to output a tailored voltage waveform applied to the table 111. The controller 115 can further implement any one of an overvoltage, overcurrent, excess temperature, and short-circuit protection for the power converter 114. To this end, the controller 115 is configured to send control signals 118 to the power converter 114 to adjust the output waveforms in order to obtain the desired IED. As a result, an ion energy control system is obtained able to provide real-time control of the output waveforms, particularly including voltage and current feedback.

Figure 2:
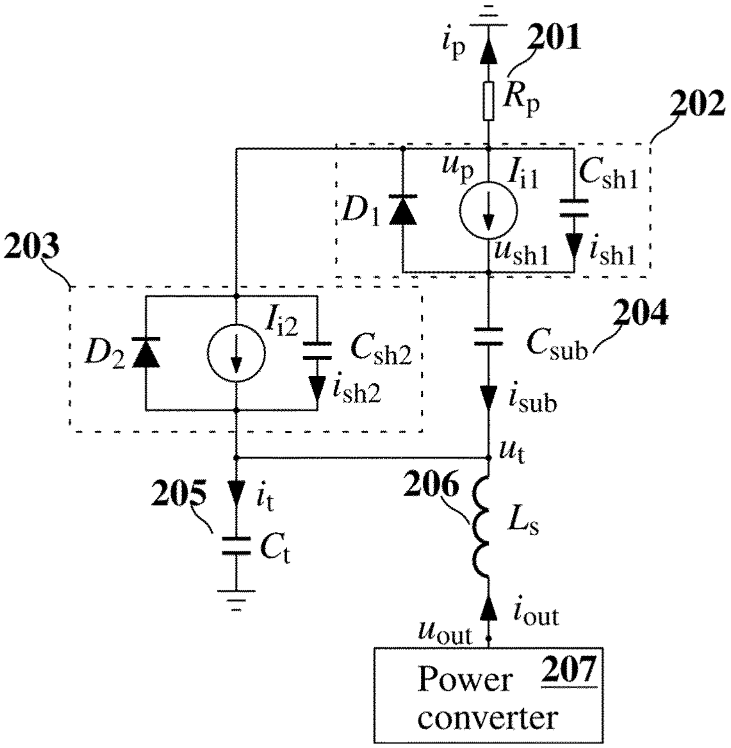
FIG. 2 represents an equivalent electric circuit model of a plasma reactor system.

A basic equivalent electric model of the plasma reactor system of FIG. 1 is depicted in FIG. 2. Nonlinear resistance $R_p$ represents the bulk plasma 201 in the reactor. Under some circumstances, the bulk plasma can alternatively be modelled as a constant voltage source. The sheath 202 formed between the bulk plasma and the substrate surface is modelled by a current source $I_{i1}$, a capacitance $C_{sh1}$, and a diode $D_1$ connected in parallel. $I_{i1}$ represents the equivalent current generated by the bombarding ions in the sheath. $C_{sh1}$ represents the equivalent sheath capacitance. $D_1$ indicates the voltage direction of the sheath. Similarly, there exists another sheath 203 formed between the bulk plasma 201 and the exposed part of the processing table. In some applications, this sheath 203 is neglected for simplicity, since its effect is not dominant. In the most of cases, the substrate 204 is dielectric, which is modelled by the capacitance $C_{sub}$. $C_t$ is a lumped capacitance, which represents the parasitic capacitance 205 formed between the table and the reactor wall and between the substrate and the reactor wall. Additionally, $L_s$ represents the total stray inductance 206 in the loop. The output of the power converter (voltage waveform generator) 207 is connected to the table.

In the plasma etching and deposition process, assuming plasma ions only carry one net charge, the plasma ions enter the substrate sheath 202 with an initial ion energy $eu_p$, where e is the elementary charge and $u_p$ is the plasma potential as depicted in FIG. 2. The positive ions get accelerated in the substrate sheath 202. Consequently, the ions arriving on the exposed surface of the substrate have an energy approximated by $$E_{ion} = -eu_{sh1}.$$

Therefore, controlling the ion energy can be realized by controlling the substrate surface potential $u_{sh1}$.

In high-selectivity etching and deposition processes, the ion energy distribution should fall within a specific and narrow energy window, which requires a quasi-constant substrate surface potential $u_{sh1}$. The ion current $I_{i1}$ is continuously charging $C_{sub}$, which can increase $u_{sh1}$. From the equivalent electric circuit model of FIG. 2, it can be derived that:

$$C_{sub}\frac{d(u_{sh1} - u_t)}{dt} = I_{i1} + C_{sh1}\frac{d(u_p - u_{sh1})}{dt}.$$

During steady-state, the plasma potential $u_p$ can be assumed to be constant. Thereby, a constant $u_{sh1}$ leads to $$\frac{du_t}{dt} = -\frac{I_{i1}}{C_{sub}}.$$

In other words, to maintain a constant $u_{sh1}$, the ion current charge effect can be compensated by linearly decreasing the voltage potential $u_t$ on the bottom of the substrate, i.e., on the processing table, with a slope equal to $-I_{i1}C_{sub}^{-1}$. In this condition, the output current $i_{out}$ is governed by $$i_{out} = -\frac{C_{sub} + C_t + C_{sh2}}{C_{sub}}I_{i1} - I_{i2},$$

which should be a negative DC value. Therefore, there are two equivalent methods to maintain a constant $u_{sh1}$, either using a voltage source converter which is linearly decreasing or using a current source converter which is actively sinking a DC current.

Furthermore, because $C_{sub}$ is continuously charging during the charge phase, it is required to discharge it periodically to avoid over-voltage on the substrate. Typically, a positive voltage pulse can be applied to swiftly discharge $C_{sub}$ and possibly other capacitances. After these capacitances are fully discharged, a negative voltage can be applied again to form an negative $u_{sh1}$ at the beginning of the slope. Denoting $V_s$ the value of the initial negative voltage applied at the output of the power converter 207, the initial voltage on the substrate surface can be approximated by $$u_{sh1} = \frac{C_{sub}}{C_{sub} + C_{sh1}}V_s.$$

Figure 3:
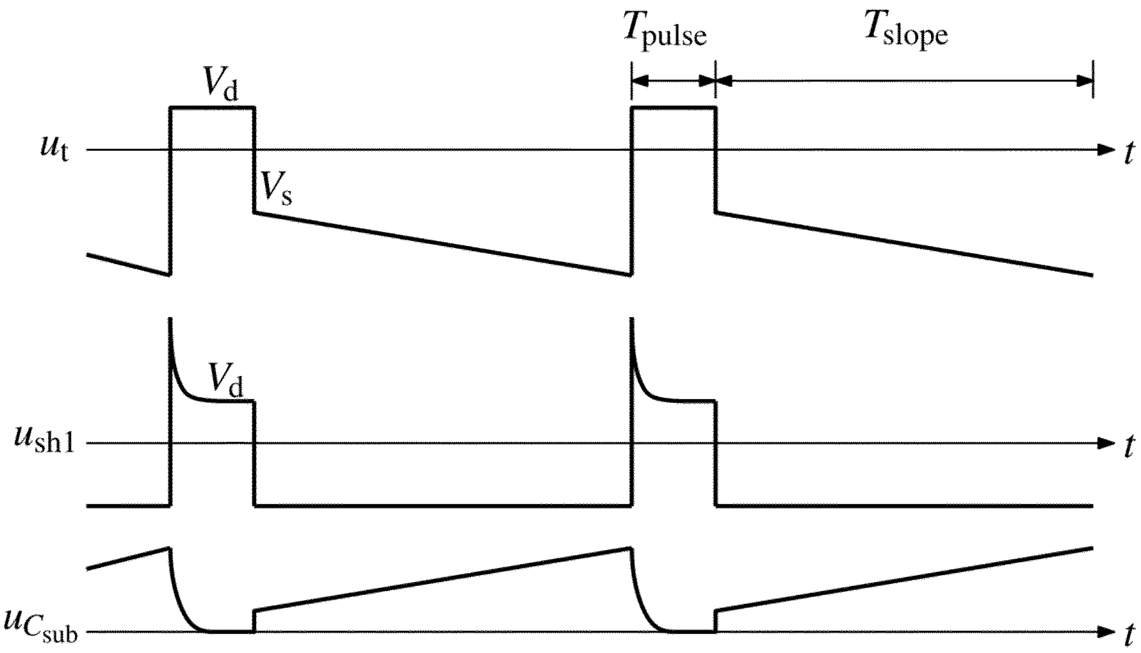
FIG. 3 represents typical waveforms of the table voltage $u_t$, the substrate surface potential $u_{sh1}$ and the voltage over the substrate capacitance $u_{C_{sub}}$.

FIG. 3 shows typical waveforms of $u_t$, $u_{sh1}$, and $u_{C_{sub}}$ so obtained. The waveform of $u_t$ applied at the processing table is referred to as the tailored voltage waveform. It can be divided into a pulse phase $T_{pulse}$ and a slope phase $T_{slope}$ in each fundamental period. The pulse phase $T_{pulse}$ comprises a voltage increase to a (positive) voltage level $V_d$ followed by a voltage decrease to a (negative) voltage level $V_s$. The pulse phase can comprise a plateau portion in which the voltage level is maintained at $V_d$. The slope phase $T_{slope}$ corresponds with the negative voltage slope starting from the voltage level $V_s$. The voltage decrease portion of the pulse phase generally has a different, typically steeper, slope compared to the negative voltage slope of the slope phase $T_{slope}$. The tailored voltage waveform $u_t$ is generated by an output voltage waveform $u_{out}$ at an output node of the power converter 207.

According the present disclosure, the voltage slope in the graph of FIG. 3 is obtained by means of a multilevel voltage source converter and obviates the need to utilize a current source. Since a current source is not required (and not included in the voltage waveform generator) anymore, it becomes much easier to scale the waveform to higher voltages and to operate at higher repetition frequencies.

Figure 4:
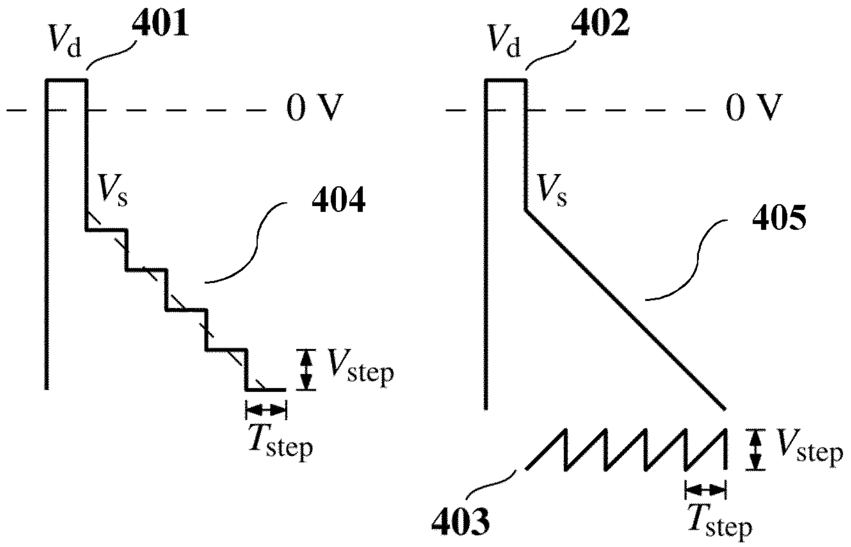
FIG. 4 illustrates how a negative voltage slope of a tailored voltage waveform is obtained through a decreasing stepped voltage waveform by considering a superposition of the negative voltage slope and a steady-state sawtooth voltage waveform.

Referring to FIG. 4 a concept of approximating the tailored waveform utilizing a multilevel voltage waveform according to the present disclosure is illustrated. Voltage waveform 401 represents an output voltage waveform of a multilevel power converter. Compared to the required tailored waveform 402, a series of regularly descending (stepped or staircase-shaped) voltage levels 404 are generated to approximate the (linear) voltage slope during $T_{slope}$.

In some examples, the descending voltage levels 404 have an identical voltage difference of $V_{step}$ and each voltage level lasts for a time interval of $T_{step}$. The waveform 404 can be seen as a superposition of two separate waveforms, being a negative continuous and possibly linear voltage slope 405 and a sawtooth waveform 403. Assuming waveform 402 to be the required tailored waveform, the slope or gradient of the portion 405 of the tailored waveform can be expressed as:

$$S = -\frac{V_{step}}{T_{step}}.$$

Based on the previous analysis, the value of $$\frac{V_{step}}{T_{step}}$$

should be equal to $$\frac{I_{i1}}{C_{sub}}$$

to exactly compensate the ion current charge effect on the substrate capacitance. Meanwhile, the waveform 403 can be seen as a steady-state sawtooth voltage ripple which creates high-frequency errors. According to the equivalent electric circuit model depicted in FIG. 2, this output voltage ripple should generate a voltage variance on the substrate surface given by $$\Delta u_{sh1} = \frac{C_{sub}}{C_{sub} + C_{sh1}} V_{step}.$$

The voltage variance $\Delta u_{sh1}$ on the substrate surface can broaden the ion energy distribution width (IEDW) equal to $e\Delta u_{sh1}$. As a result, given a quantitative requirement of the ion energy distribution width, the maximum allowed $V_{step}$ can be calculated, which is governed by $$V_{stepmax} = \frac{C_{sub} + C_{sh1}}{C_{sub}} IEDW.$$

It should be noted that although FIG. 4 shows a waveform with five consecutive voltage steps, it is possible to have either more or less number of voltage steps, depending on the converter topology and operating conditions.

In other examples, $V_{step}$ and/or $T_{step}$ may differ between different steps. This may allow improved control of the voltage slope, may allow generating other kinds of (negative) voltage slope waveforms, such as non-linear slopes, and/or may relax requirements on the multilevel voltage source converters. In such case, the instantaneous value of $$\frac{V_{step}}{T_{step}}$$

can be made to match an instantaneous value of $$\frac{I_{i1}}{C_{sub}}$$

Figure 5A:
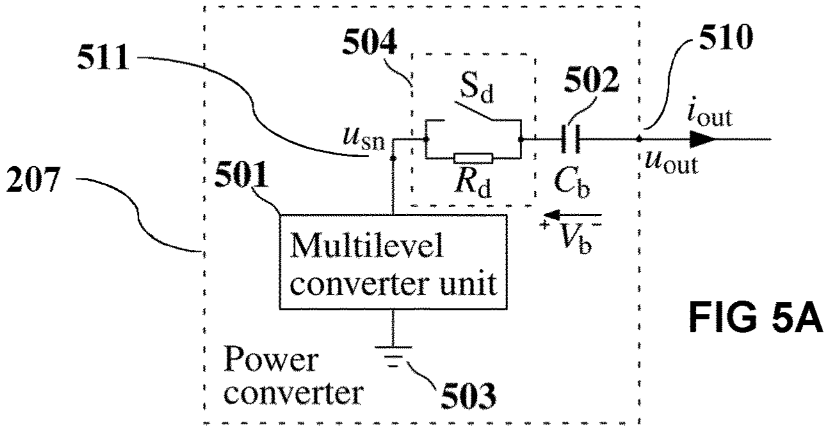
FIG. 5A represents a block diagram of a voltage waveform generator.

Referring to FIG. 5A, a multilevel converter to generate the required multilevel voltage waveform 404 comprises a multilevel voltage source converter unit 501 coupled to a switch node 511. Multilevel converter unit 501 is configured to generate a switch node voltage $u_{sn}$ at the switch node 511. The switch node 511 is coupled to output node 510 via optional voltage bias component 502, such as a blocking capacitor $C_b$ and/or a switched damping circuit 504. An output of the voltage waveform generator, including an output voltage $u_{out}$ and an output current $i_{out}$, is applied at the output node 510. Output node 510 can be connected to the processing table 111 (FIG. 1). Since the plasma reactor load is grounded to PE (FIG. 1), the multilevel converter unit 501 should be grounded to PE 503 as well.

Figure 5B:
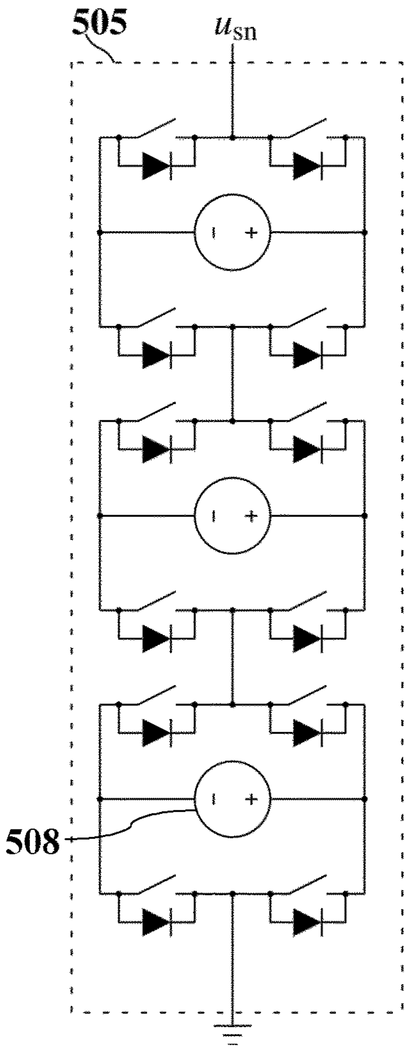
FIG. 5B represents a cascaded H-bridge converter as an example implementation of the multilevel voltage converter in the voltage waveform generator of FIG. 5A.
Figure 5C:
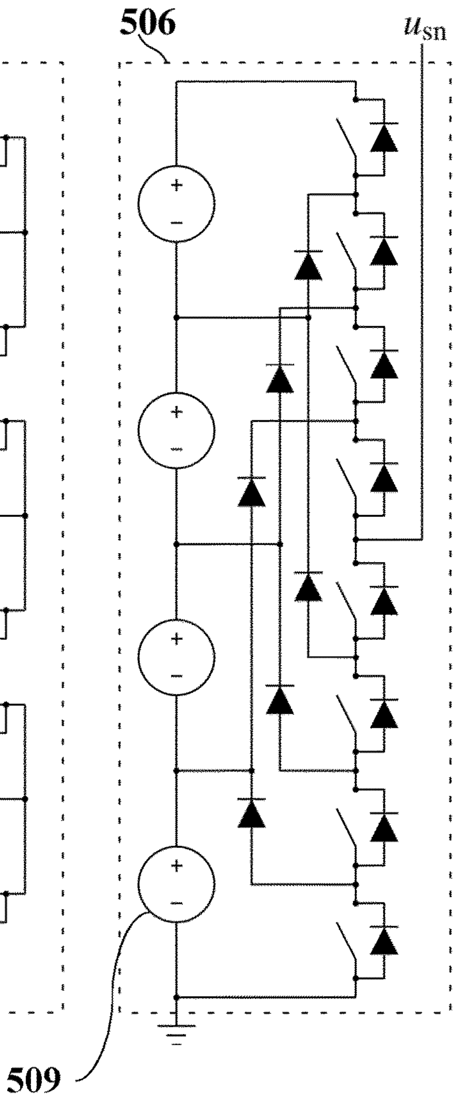
FIG. 5C represents a neutral-point clamped (NPC) converter as an example implementation of the multilevel voltage converter in the voltage waveform generator of FIG. 5A.
Figure 5D:
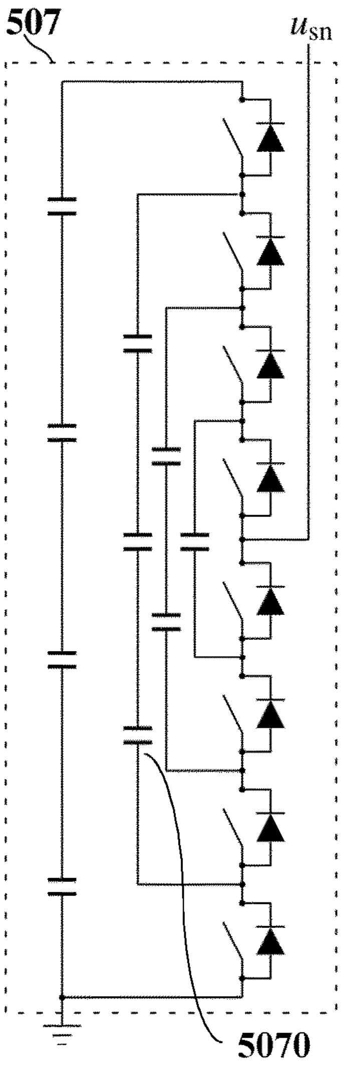
FIG. 5D represents a flying capacitor converter as an example implementation of the multilevel voltage converter in the voltage waveform generator of FIG. 5A.

Referring to FIGS. 5B-5D, the multilevel converter unit 501 can be realized with a various converter topologies, such as a cascaded H-bridge converter 505, a neutral point clamped converter (NPC) 506, and a flying-capacitor converter (FCC) 507. All of them are scalable and can be extended to more voltage levels. It will be appreciated that the possible realizations of the multilevel converter unit are not limited to these topologies. Other multilevel topologies, such as a modular multilevel converter (MMC), or a combination of different multilevel topologies can be utilized to realize the multilevel converter unit 501.

In FIGS. 5B-5D, the power switches are modelled by ideal switches in parallel with diodes. In practice, different kinds of power semiconductors can be used, including but not limited to silicon-based and silicon carbide (SiC) metal-oxide-semiconductor field-effect transistor (MOSFET), insulated-gate bipolar transistor (IGBT) with anti-parallel diode, and gallium nitride (GaN) transistor. These switches are advantageously controllable and their operation is controlled through control unit 115 (FIG. 1). In addition, the voltage sources 508, 509 of the cascaded-H bridge 505 and the neutral point clamped converter 506, respectively, can be replaced by flying capacitors 5070 as shown in FIG. 5D. Voltage balancing to maintain constant capacitor voltages can be implemented by utilizing redundant switching states, possibly in combination with measurement feedback from the voltage and current measurement units 116, 119 (FIG. 1). In some examples, the voltage levels of the voltage sources or the capacitor voltages can be different, e.g., asymmetrical multilevel converters can be utilized as the multilevel converter unit 501. An asymmetrical multilevel converter can refer to a converter having multiple voltage levels defined by submodules or cells (e.g., cascaded H-bridge cells or flying capacitor circuits) having different voltages. Specifically, an asymmetrical cascaded H-bridge converter unit refers to a cascaded H-bridge converter comprising cascaded H-bridge modules having different DC-link voltages.

During the steady-state, a self-biased blocking voltage $V_b$ is formed over the blocking capacitor $C_b$ and the average current through $C_b$ becomes zero. If the value of $C_b$ is sufficiently large, the voltage ripple over $C_b$ can be neglected and the blocking voltage can be regarded as a DC value. Hence, one benefit of the blocking capacitor $C_b$ is that not only it keeps a balanced net output charge, thus obtaining a well-defined output current, but it also enables achieving a bipolar output voltage by using only unipolar (positive) DC voltage supplies. Without $C_b$, a negative voltage source would be required to maintain a negative bias to the output voltage waveforms. In addition, the blocking voltage can be controlled by adapting one or more parameters of the tailored waveforms, including but not limited to the frequency, the pulse duration, and the discharge voltage. This adds an extra control degree of the tailored waveform, increasing the flexibility of ion energy control.

The switched damping circuit 504 comprises a (semiconductor) power switch $S_d$ in parallel with a damping element, such as a damping resistor $R_d$. When $S_d$ is turned ON (conducting), the damping resistor $R_d$ is shorted. When $S_d$ is turned OFF (open), the damping resistor $R_d$ is connected to the output, which can limit the transient current or dampen any resonance, but is dissipative. Since there is stray inductance and resistance in the loop, which helps limiting the transient current as well, this component is unnecessary if the transient current is not a concern. In practice, there can be non-ideal factors that cause small LC resonances on top of the tailored voltage waveform. Under these circumstances, the damping resistor $R_d$ enables to substantially eliminate this small LC resonance. In combination with further measures, such as additional intermediate voltages and trajectory control, aiming at reducing as much as possible the occurring LC resonances in a non-dissipative manner, the power dissipation caused by the switched damping circuit can be substantially reduced.

Figure 6A:
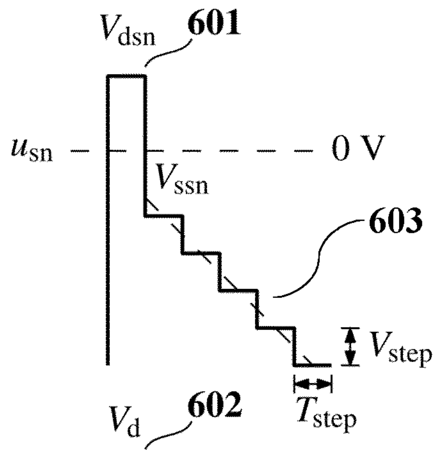
FIG. 6A illustrates a typical waveform of the switch-node voltage according to the present disclosure.

Referring to FIG. 6A, the multilevel converter 501 can be configured to generate voltage waveform 601 as the switch node voltage $u_{sn}$. Waveform 601 comprises a decreasing stepped voltage waveform 603 with voltage step (fall) $V_{step}$ and time step (depth) $T_{step}$. Waveform 601 can further comprise a voltage pulse $V_{dsn}$ which can be generated by the multilevel converter 501, or by another suitable converter comprised in the voltage waveform generator 207. Stepped waveform 603 starts at a starting voltage level $V_{ssn}$ smaller than $V_{dsn}$. Advantageously, stepped waveform 603 starts at a voltage level $V_{ssn}$ defined by the required energy of the bombarding ions when arriving on the substrate surface to be processed, or in other words, $V_{ssn}$ is advantageously defined by the desired substrate surface potential $u_{sh1}$ (FIG. 2) account taken of any possible bias voltage acting between the switch node 511 and the output node 510. Stepped waveform 603 can start immediately following the voltage pulse $V_{dsn}$.

Figure 6B:
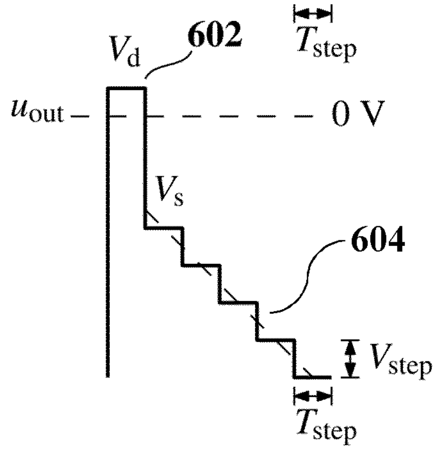
FIG. 6B illustrates a typical waveform of the output voltage at the output node of the voltage waveform generator according to the present disclosure.

Referring to FIG. 6B, the voltage waveform 601 is converted to voltage waveform 602 as the output node voltage $u_{out}$. Waveforms 601 and 602 are identical, except for a bias between $u_{sn}$ and $u_{out}$ due to the self-biased voltage $V_b$ formed over $C_b$. Since typically $V_b$ is a positive value (FIG. 5A), this leads to:

$u_{out}=u_{sn}-V_b$. The ion energy will hence be determined by the value of $V_s=V_{ssn}-V_b$ applied at the start of the negative voltage slope (stepped) waveform 604, i.e. $V_s$ advantageously corresponds with the first voltage level of the stepped waveform 604. The pitch (gradient) of the stepped voltage waveform 603, 604 is governed by $V_{step}$ and $T_{step}$ as indicated above.

Figure 7:
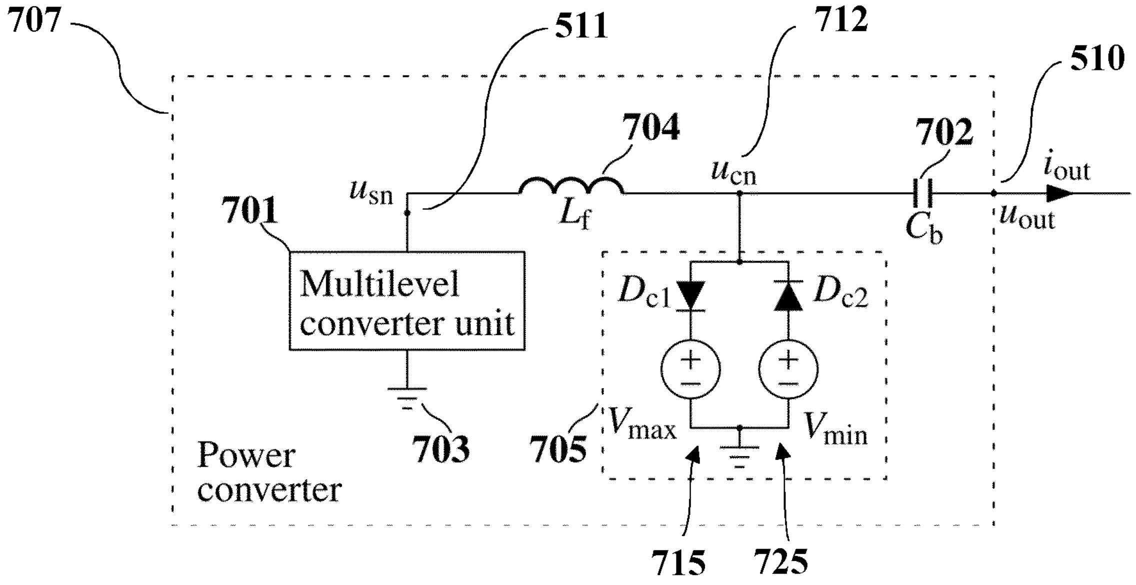
FIG. 7 represents a block diagram of a voltage waveform generator of the present disclosure including a filter inductor.

Referring to FIG. 7, an alternative embodiment of voltage waveform generator 707 comprises a multilevel converter unit 701 which can be identical to the multilevel converter unit 501 of FIG. 5. To further reduce the output voltage ripple during the slope phase for a narrower IED, an output filter inductor 704 can be added between the switch node 511 and the output node 510. The filter inductor $L_f$ 704 is advantageously added in series with the multilevel converter unit 701. Since $L_f$ and the capacitive plasma load form an LC resonant circuit, a large resonance can be introduced to the output waveforms at the rising and falling edge of the voltage pulse, creating over voltage and current.

A clamping circuit 705 is advantageously connected to a clamping node 712 in between the switch node 511 and the output node 510. Advantageously, clamping node 712 is arranged between the filter inductor $L_f$ 704 and the blocking capacitor $C_b$ 702. Clamping circuit 705 can comprise an upper clamping leg 715 and/or a lower clamping leg 725 configured to limit the maximum value of $u_{cn}$ to $V_{max}$ and the minimum value of $u_{cn}$ to $V_{min}$, respectively. Each of the upper clamping leg 715 and lower clamping leg can comprise a clamping diode $D_{c1}$ and $D_{c2}$ respectively in series with a voltage source $V_{max}$ and $V_{min}$, respectively. It will be appreciated that $V_{max}$ and $V_{min}$ can be either additional voltage sources or a voltage source of the multilevel converter unit 701. Taking the neutral point clamped converter 506 of FIG. 5C as an example of the multilevel converter unit 701, $D_{c1}$ can be connected to the highest voltage of the NPC unit 506 and $D_{c2}$ can be connected to the ground.

Figure 8A:
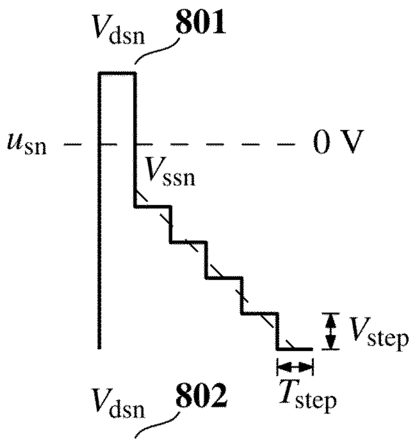
FIG. 8A illustrates a typical waveform of the switch-node voltage according to the present disclosure.
Figure 8B:
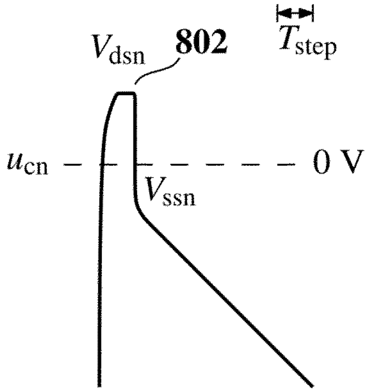
FIG. 8B illustrates a typical waveform of the clamping node voltage according to the present disclosure.
Figure 8C:
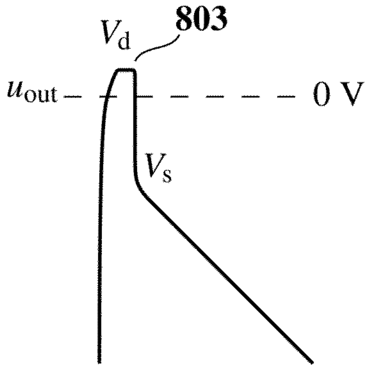
FIG. 8C illustrates a typical waveform of the output voltage of the voltage waveform generator of FIG. 7.

FIGS. 8A-8C show typical waveforms generated by the voltage waveform generator 707 with a filter inductor 704. The stepped voltage waveform 801 applied at the switch node 511 is smoothed by the filter inductor 704 to obtain a waveform 802 with smooth voltage slope at a downstream clamping node 512. Due to the existence of the filter inductor, the rising and falling edge of the voltage pulse 803 of $u_{out}$ become slower. Moreover, during the slope phase, $u_{out}$ is filtered and the waveform can be smoother. The slope (gradient) of $u_{out}$ is determined by $V_{step}$ and $T_{step}$ as well. By correctly selecting the value of the filter inductance, the voltage ripple can be further reduced and the IED can be narrower.

Figure 9A:
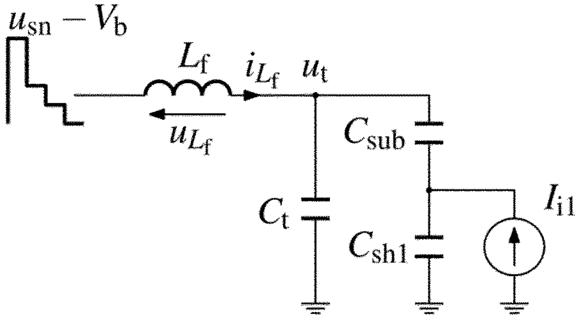
FIG. 9A represents a simplified equivalent electrical circuit of the voltage waveform generator with filter inductor according to the present disclosure in which a stepped voltage waveform is applied.
Figure 9B:
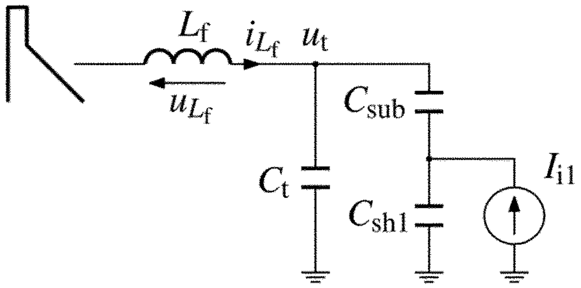
FIG. 9B represents the simplified equivalent electrical circuit of FIG. 9A in which a waveform with linear voltage slope is applied.
Figure 9C:
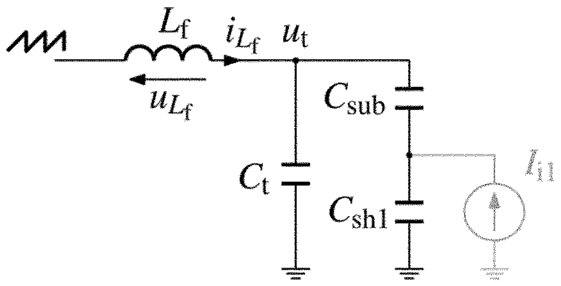
FIG. 9C represents the simplified equivalent electrical circuit of FIG. 9A in which a sawtooth waveform is applied representing a difference between the waveforms of FIG. 9A and FIG. 9B.

A method to determine the filter inductance value can be based on an equivalent circuit analysis as shown in FIG. 9A. Since the value of $C_b$ should be much larger compared to other capacitances in the load, the voltage of $C_b$ can be considered constant. It can be seen as a negative voltage bias added to $u_{cn}$. In addition, the stray inductance in the loop is typically much smaller than the filter inductance, so it can be neglected for simplicity. Therefore, in the equivalent circuit shown in FIG. 9A, the original circuit shown in FIG. 7 is equivalent to that a voltage equal to $u_{sn}-V_b$ is connected to the filter inductor and then the plasma reactor table. Furthermore, this voltage waveform can be regarded as a superposition of two waveforms as waveforms 402 and 403 shown in FIG. 4. These two waveforms can be analyzed separately as shown in FIG. 9B and FIG. 9C. The voltage slope in FIG. 9B should compensate the ion current $I_{i1}$ exactly while the sawtooth voltage waveform in FIG. 9C creates the voltage variance on the substrate surface potential $u_{sh1}$, which broadens the IED.

Figure 10:
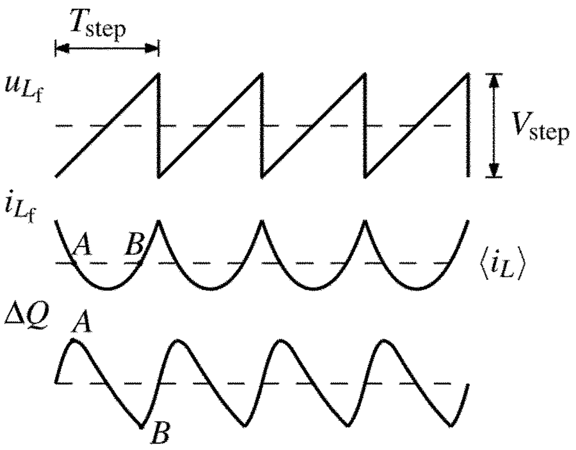
FIG. 10 represents plots of waveforms of the filter inductor voltage, filter inductor current and electric charge during the voltage slope phase.

To determine the inductance $L_f$, the waveforms of the filter inductor voltage and current during the slope phase should be derived, as plotted in FIG. 10. The sawtooth voltage waveform in one switching cycle $T_{step}$ can be described by:

$$u_{L_f}(t) = \frac{V_{step}}{T_{step}}t - \frac{1}{2}V_{step}.$$

The average inductor current is governed by $$\langle i_{L_f}(t)\rangle = -I_{i1}\left(1 + \frac{C_t}{C_{sub}}\right).$$

The inductor current in one switching cycle can be described by:

$$i_{L_f}(t) = \frac{V_{step}}{2L_f T_{step}}t^2 - \frac{V_{step}}{2L_f}t + \frac{V_{step}T_{step}}{12L_f} - I_{i1}\left(1 + \frac{C_t}{C_{sub}}\right).$$

A DC inductor current is required during the slope phase for the narrowest IED. The inductor current ripple caused by the sawtooth voltage waveform can introduce charge difference through the sheath capacitance $C_{sh1}$, which creates voltage variance on the substrate surface and broadens the IED. The maximum charge $\Delta Q_{max}$ difference through $C_{sh1}$ occurs when $i_{L_f}(t)=\langle i_{L_f}(t)\rangle$ as denoted by time A and B in FIG. 10, which is equal to:

$$\Delta Q_{max} = \frac{\sqrt{3}\, C_{sh1} C_{sub} V_{step} T_{step}^2}{108\, L_f(C_{sh1}C_{sub} + C_t C_{sh1} + C_t C_{sub})}.$$

The IEDW is equal to the substrate sheath voltage ripple determined by:

$$IEDW = e\Delta u_{C_{sh1}} = e\frac{\Delta Q_{max}}{C_{sh1}},$$

where IEDW is in eV unit. Therefore, given the parameters of the load and the required IEDW, the minimum filter inductance can be calculated by:

$$L_{fmin} = \frac{e}{IEDW}\frac{\sqrt{3}\, C_{sub} V_{step} T_{step}^2}{108\, L_f(C_{sh1}C_{sub} + C_t C_{sh1} + C_t C_{sub})}.$$

Moreover, since the slope rate is determined by:

$$-\frac{V_{step}}{T_{step}} = -\frac{I_{i1}}{C_{sub}},$$

$L_{f,min}$ can be determined by:

$$L_{f,min} = \frac{e}{IEDW}\frac{\sqrt{3}\, I_{i1} T_{step}^3}{108\, L_f(C_{sh1}C_{sub} + C_t C_{sh1} + C_t C_{sub})}$$

if using a fixed $T_{step}$.

Figure 11:
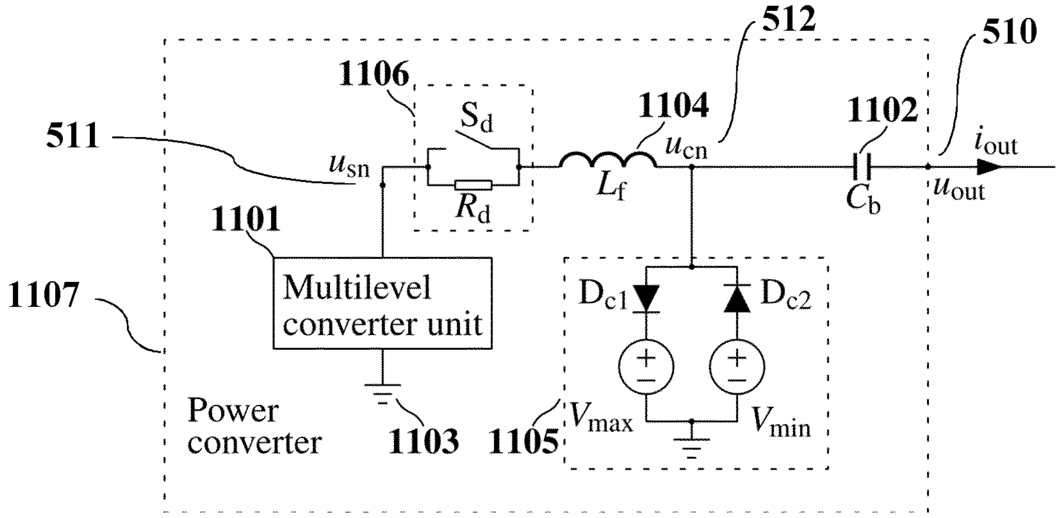
FIG. 11 represents a block diagram of the voltage waveform generator of FIG. 7 to which a switched damping circuit is added between the switch node and the clamping node.

Referring to FIG. 11, voltage waveform generator 1107 can combine the features of voltage waveform generator 207 of FIG. 5 and of voltage waveform generator 707 of FIG. 7. Multilevel converter unit 1101 can be identical to multilevel converter unit 501 and is connected between PE 1103 and switch node 511. A switched damping circuit 1106, which can be identical to the switched damping circuit 504 of the voltage waveform generator 207 can be arranged in series with filter inductor 1104 and blocking capacitor 1102, between the switch node 511 and the output node 510. Clamping circuit 1105 can be identical to clamping circuit 705. Clamping node 512 is advantageously arranged between the filter inductor 1104 and the blocking capacitor 1102.

Figure 12:
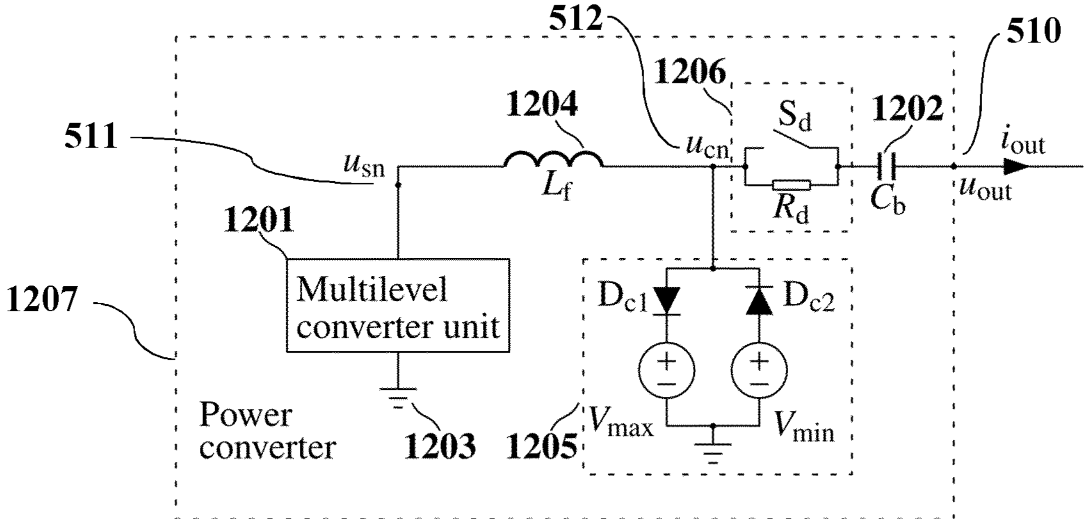
FIG. 12 represents an alternative block diagram of a voltage waveform generator as in FIG. 11, in which the switched damping circuit is connected between the clamping node and the blocking capacitor.

Referring to FIG. 12, in an alternative voltage waveform generator 1207, the switched damping circuit 1206 (identical to switched damping circuit 1106) is arranged between the filter inductor 1204 and the blocking capacitor 1202, possibly between the clamping node formed by clamping circuit 1205 and the blocking capacitor 1202. Multilevel converter unit 1201 can be identical to multilevel converter unit 1101, connected between PE 1203 and switch node 511.

Figure 13:
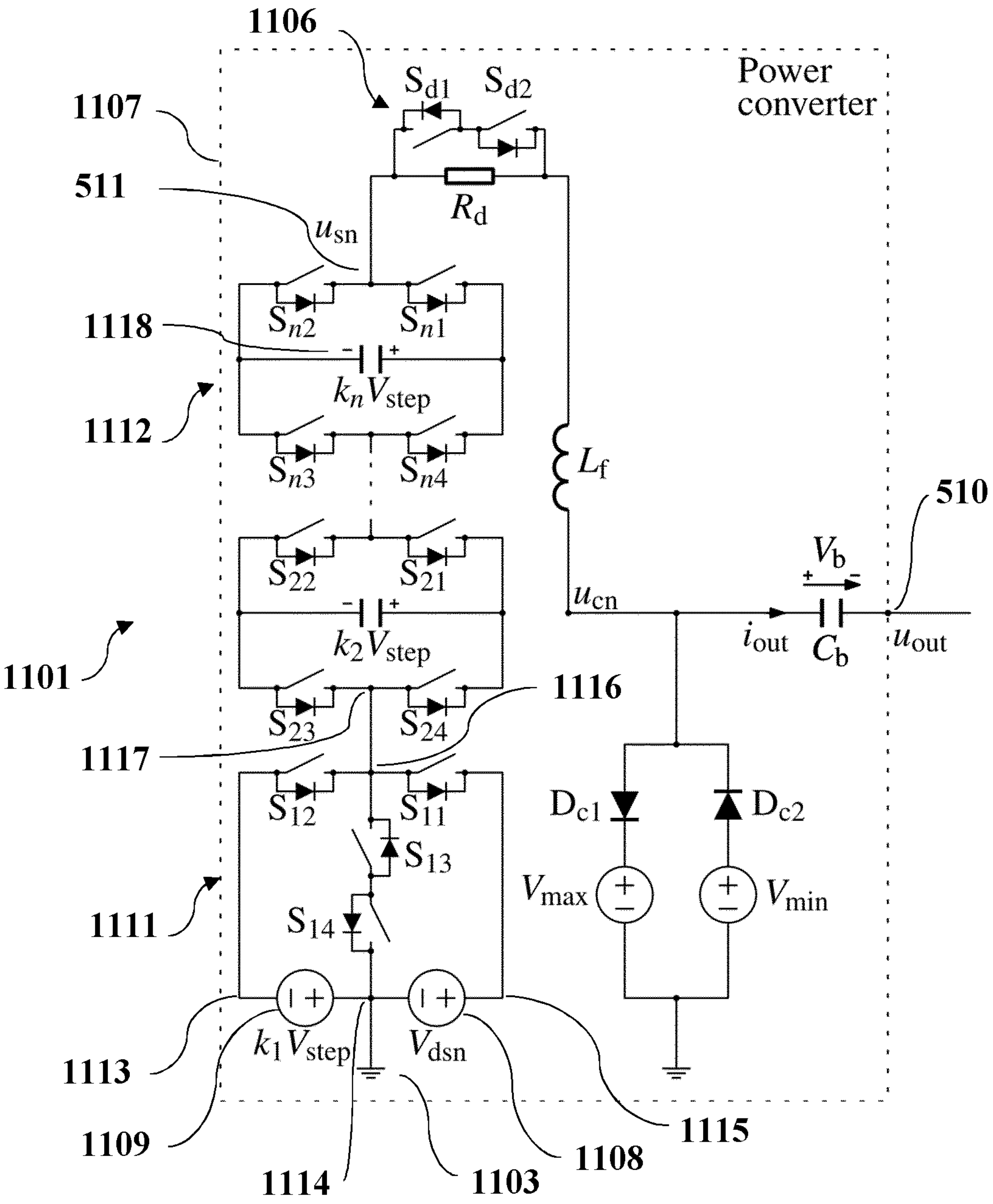
FIG. 13 represents a topology of a voltage waveform generator according to the present disclosure, comprising a class of multilevel power converter combining a T-type converter and a series of cascaded H-bridge cells.

Referring to FIG. 13, an exemplary topology of the voltage waveform generator 1107 comprises a multilevel converter unit 1101 comprising a T-type converter 1111 and a series of cascaded H-bridge cells 1112. The T-type converter 1111 comprises a low voltage node 1113, a midpoint voltage node 1114 and a high voltage node 1115 forming input nodes of the T-type converter 1111. Two DC voltage sources 1108, 1109 respectively providing voltage levels $V_{dsn}$ and $k_1V_{step}$ in which $k_1$ is an integer number, advantageously larger than 0, are connected in series between nodes 1113 and 1115. Specifically, a negative voltage terminal of DC voltage source 1109 is coupled to the low voltage node 1113 and a positive voltage terminal of DC voltage source 1109 is coupled to the midpoint voltage node 1114. Midpoint voltage node 1114 is coupled to the negative voltage terminal of DC voltage source 1108 and the positive voltage terminal of DC voltage source 1108 is coupled to the high voltage node 1115. The midpoint voltage node 1114 can be connected to PE 1103. Switches $S_{11}$ and $S_{12}$, which are advantageously current-bidirectional (two-quadrant) switches, connect respectively each of the high voltage node 1115 and the low voltage node 1113 to the output node 1116 of T-type converter 1111. The midpoint voltage node 1114 is connected to the output node 1116 via a switch $S_{13}$-$S_{14}$, which is advantageously a four-quadrant switch. The output node 1116 of T-type converter 1111 is advantageously connected to (a first terminal 1117 of a first one of) the series of cascaded H-bridge cells 1112. A second terminal of the last one of the series of cascaded H-bridge cells 1112 advantageously defines the switch node 511. The benefit of using a T-type converter on the bottom is that non-isolated DC-DC converters can be utilized as DC voltage sources, thus having less electromagnetic interference (EMI) issues as compared to when utilizing floating voltage supplies. It will be appreciated that the value of $V_{dsn}$ is not necessarily to be a multiple of $V_{step}$. As a result, the required voltage pulse can be generated with more flexibility.

A total number of cascaded H-bridge cells 1112 equal to n-1 (n=2, 3, . . . ) can be cascaded between converter 1111 (output node 1116) and switch node 511. Each of the cascaded H-bridge cells 1112 advantageously comprises a capacitor 1118 in the DC-link connecting the midpoints of the two switch arms, respectively $S_{i1}$-$S_{i4}$ and $S_{i2}$-$S_{i3}$, i=2, . . . , n. The DC-link voltages of each cascaded H-bridge cell are $k_2V_{step}$, $k_3V_{step}$, . . . , $k_nV_{step}$, respectively, with $k_2$, $k_3$, . . . , $k_n$ being all positive integers and possibly different values to obtain an asymmetrical converter. The maximum and minimum switch node voltage $u_{sn}$ are $V_{dsn}+(k_2+k_3+ \ldots +k_n)V_{step}$ and $-(k_1+k_2+k_3+ \ldots +k_n)V_{step}$, respectively. Depending on the value combinations of $k_2$, $k_3$, . . . , $k_n$, it is possible that some H-bridge cells have redundant switching states when delivering the same voltage values. In this case, the redundant switching states can be used to keep the voltages of the DC-link capacitors 1118 balanced. Alternatively, an isolated DC-DC voltage source can be substituted for the DC-link capacitor 1118 for one or more (or all) of the H-bridge cells without the redundant switching states. One advantage of the asymmetrical configuration of the multilevel converter unit 1101 is that much more different voltage levels than the number of modules (T-type converter 1111 and number of H-bridge cells 1112) can be obtained.

Byway of example, if $k_1=k_2=k_3==k_n$, i.e., the cascaded H-bridge cells are linearly scaled. Consequently, each H-bridge cell has redundant states and is capable of voltage balancing. By contrast, if $k_1=3k_2=3^2k_3= \ldots =3^{n-1}k_n$, i.e., the cascaded H-bridge cells are scaled in a trinary configuration, there is no redundant switching state, and all the cascaded H-bridge cells should use isolated DC-DC converters.

The power switches $S_{11}$, $S_{12}$, . . . , $S_{n4}$ can be modelled by ideal switches in parallel with diodes. In practice, different kinds of power semiconductors can be utilized, including but not limited to Si-based and SiC MOSFET, IGBT with anti-parallel diode, and GaN transistor. Additionally, the switches $S_{d1}$ and $S_{d2}$ of the switched damping circuit 1106 form a four-quadrant switch, which can conduct bidirectional current when turned on and block bidirectional voltage when turned off. The switched damping circuit 1106 can be used to damp the LC resonance.

The multilevel converter unit 1101 can be advantageously utilized to generate the voltage pulse in addition to the stepped sloped voltage. This is specifically advantageous when the voltage levels for the voltage pulse (during $T_{pulse}$) can be expressed as integer multiples of $V_{step}$. Alternatively, the voltage waveform generator can comprise different converters for the voltage pulse and the voltage slope, particularly when the pulse magnitude (both the rise and fall edge) should be determined flexibly and this value might not be an integer multiple of the multilevel voltage ($V_{step}$). By so doing, a broader range of voltage values can be generated, although this is not always required. Since $V_{dsn}$ doesn't need to be a multiple of $V_{step}$, it can advantageously be selected to generate the voltage pulse of flexible values.

With the combination of the T-type converter and the cascaded H-bridge cells, intermediate voltage levels can be obtained not only during the voltage slope, but also during the voltage pulse period and between the voltage pulse and the negative voltage slope. This advantageously enables the load capacitor voltage to softly resonate to the target value by LC resonance. Byway of example, if during the plateau time ($T_{pulse}$), the multilevel converter unit outputs $V_{dsn}$, and at the beginning of the negative voltage slope, the multilevel converter unit should output $3V_{step}$, one or more intermediate voltage levels between $V_{dsn}$ and $3V_{step}$ can be output, e.g., $V_{dsn}-V_{step}$, $V_{dsn}-2V_{step}$, or $V_{dsn}-3V_{step}$, for a proper amount of time. As a result, the voltage of the load capacitor can be made to smoothly fall due to the LC resonance, and ideally this process can be non-dissipative. The selection of the intermediate voltage levels and their corresponding time duration can be determined by a method called trajectory control as is known in the art (see e.g. DOI: 10.23919/IPEC-Himeji2022-ECCE53331.2022.9806909 Yu Qihao et al., "Accurate Ion Energy Control in Plasma Processing by Switched-Mode Power Converter", 2022 International Power Electronics Conference).

Figure 14:
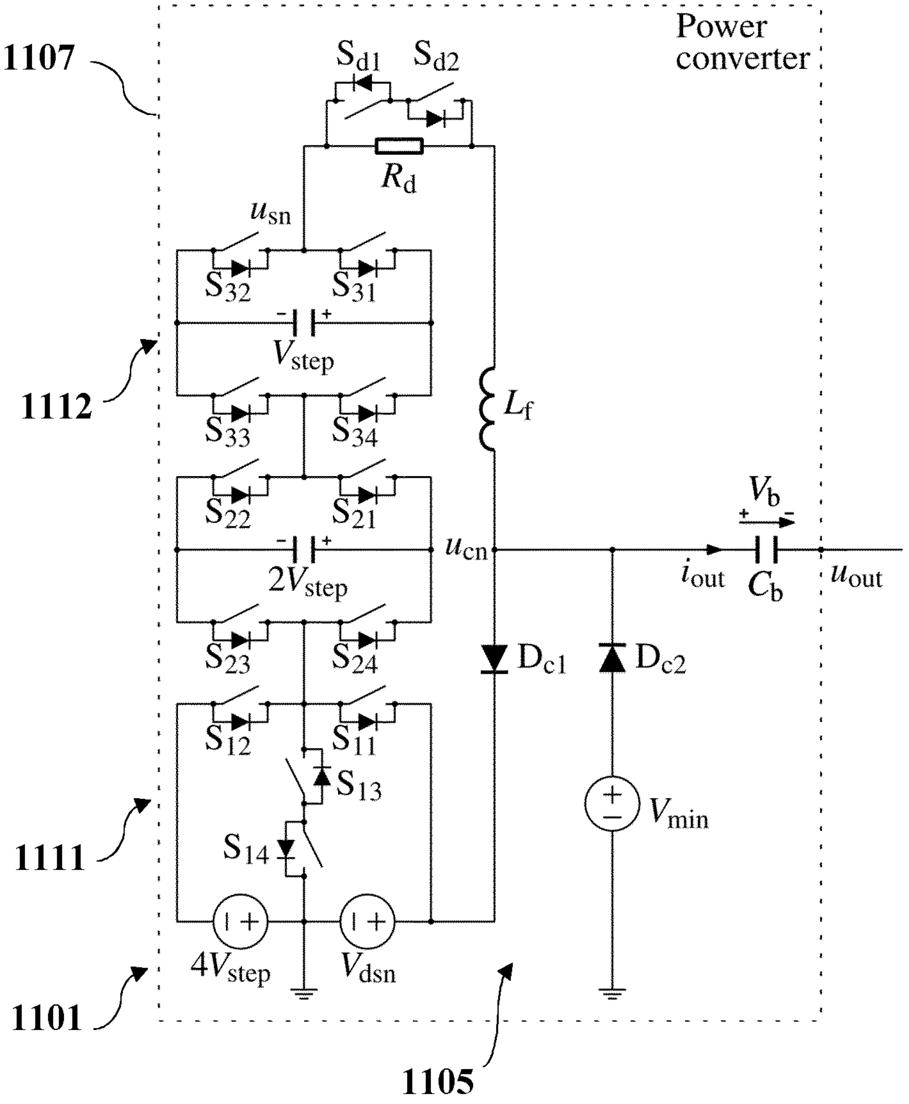
FIG. 14 represents another topology of a voltage waveform generator according to the present disclosure, comprising a multilevel power converter topology with a T-type converter and two cascaded H-bridge cells.

Referring to FIG. 14, a specific example of the voltage waveform generator 1107 can comprise two cascaded H-bridge cells 1112 scaled in a binary configuration with $k_1=2k_2=4k_3$.

In a specific implementation of the clamping circuit 1105, the upper clamping leg is clamped to a (maximal) voltage level of the multilevel converter unit 1101. Specifically, the maximum value of $u_{cn}$ is clamped to $V_{dsn}$ through $D_{c1}$. This advantageously saves an extra voltage source $V_{max}$ compared to the clamping circuit FIG. 13. Additionally, the voltage levels of $u_{sn}$ above $V_{dsn}$ can be skipped, so that $V_{dsn}+V_{step}$, $V_{dsn}+2V_{step}$, and $V_{dsn}+3V_{step}$ are not used. This enhances the voltage balancing capacity of this converter.

Assuming the state of a submodule 1111, 1112 of multilevel converter unit 1101 is represented by 1, 0, and −1 when the positive voltage, zero voltage, and the negative voltage of the submodule is connected to the output, respectively. For example, vector [1,0,0] stands for positive $V_{dsn}$ of the first submodule (T-type converter 1111) is connected while the two H-bridge cells 1112 are bypassed. Therefore, [1,0,0] corresponds to $u_{sn}=V_{dsn}$. Similarly, all the possible voltage levels of $u_{sn}$ can be found as well as the corresponding state vectors, as depicted in Table 1. It can be seen that there are sufficient redundant switching states for both H-bridge cells. Therefore, those redundant states can be used for balancing both flying capacitors.

TABLE 1

Possible voltage levels of $u_{sn}$ and the corresponding switching state vectors

| Voltage level | Switching state vector |
|---|---|
| $V_{dsn}$ | [1, 0, 0] |
| $V_{dsn} - V_{step}$ | [1, 0, −1] |
| $V_{dsn} - 2V_{step}$ | [1, −1, 0] |
| $V_{dsn} - 3V_{step}$ | [1, −1, −1] |
| $3V_{step}$ | [0, 1, 1] |
| $2V_{step}$ | [0, 1, 0] |
| $V_{step}$ | [0, 0, 1] |
| 0 | [0, 0, 0] |
| $-V_{step}$ | [−1, 1, 1], [0, −1, 1], [0, 0, −1] |
| $-2V_{step}$ | [−1, 1, 0], [0, −1, 0] |
| $-3V_{step}$ | [−1, 0, 1], [−1, 1, −1], [0, −1, −1] |
| $-4V_{step}$ | [−1, 0, 0], |
| $-5V_{step}$ | [−1, −1, 1], [−1, 0, −1] |
| $-6V_{step}$ | [−1, −1, 0] |
| $-7V_{step}$ | [−1, −1, −1] |

Figure 15:
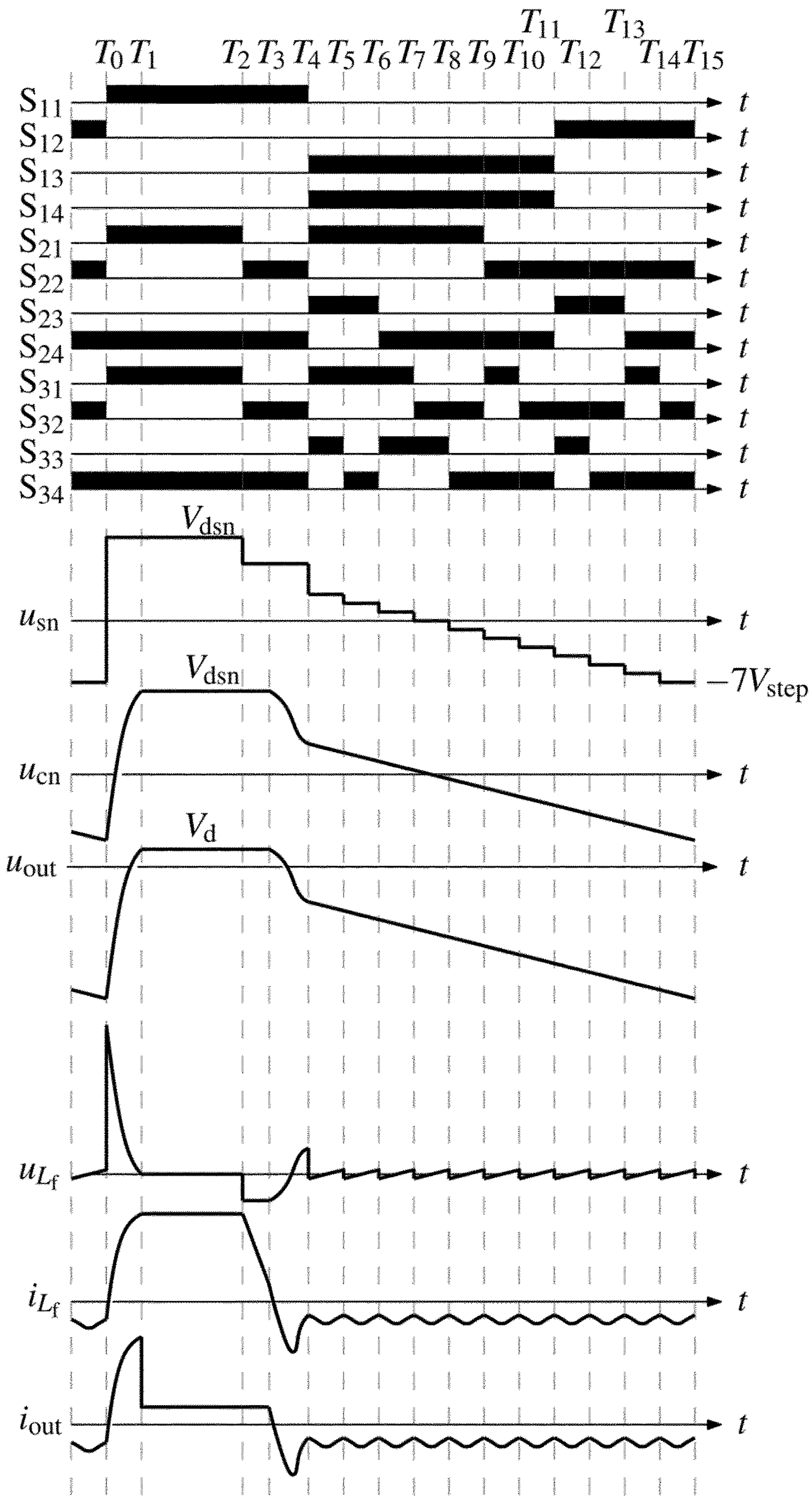
FIG. 15 represents switching states of the voltage waveform generator of FIG. 14 and corresponding waveforms of the switch node voltage, the clamping node voltage, the output node voltage, the filter inductor voltage, the filter inductor current and the output current for both the voltage pulse and the negative voltage slope of the tailored waveform.

FIG. 15 shows an example of how the voltage waveform generator 1107 of FIG. 14 can be operated to obtain a tailored voltage waveform. The switching frequency of each cell is inversely scaled with their DC-link voltage. At the end of the previous slope phase, as denoted by $T_0$, $V_{dsn}$ is connected to $u_{sn}$ to generate the positive pulse for discharge. The filter inductor current $i_{Lf}$ and the voltage of $u_{cn}$ and $u_{out}$ start rising. Meanwhile, all the load capacitors start to discharge.

At $T_1$, $i_{L_f}$ rises to a relatively large value and $u_{cn}$ reaches $V_{dsn}$ and then clamped to $V_{dsn}$ during $T_1$~$T_2$. During the steady-state of the system, a DC blocking voltage $V_b$ forms over the blocking capacitor. Therefore, the output voltage $u_{out}$ is clamped to $u_{out}=V_{dsn}-V_b$. The value of $V_b$ can be adjusted by controlling the time duration between $T_1$ and $T_2$. Therefore, $u_{out}$ can be controlled by adjusting $V_b$ when $V_{dsn}$ is fixed. During $T_1$~$T_2$, all the load capacitors should be fully discharged and be ready for a new slope phase. When all the load capacitors are fully discharged, the output current $i_{out}$ is a small DC value.

At $T_2$, a new voltage value is applied to $u_{sn}$, which can be one of $V_{dsn}-V_{step}$, $V_{dsn}-V_{step}$ or $V_{dsn}-3V_{step}$. There is a negative voltage over the filter inductor and $i_{L_f}$ starts falling. Firstly, $u_{cn}$ is still clamped to $V_{dsn}$ since $i_{L_f}$ is larger than $i_{out}$. At $T_3$ when $i_{L_f}$ falls until $i_{L_f}$=out, $u_{cn}$ is not clamped to $V_{dsn}$ anymore and an LC resonance is triggered. Both $u_{cn}$ and $u_{out}$ start falling.

At $T_4$, $u_{cn}$ and $u_{out}$ reach the desired start voltage value of the slope phase. After that, the output slope can be generated by consecutively applying $3V_{step}$, $2V_{step}$, . . . , $-7V_{step}$ to $u_{sn}$ during $T_4$~$T_{15}$ to obtain a regularly decreasing stepped voltage. Correct switching states can be selected for voltage balancing purpose based on Table 1. Since the voltage slope is determined by $$\frac{V_{step}}{T_{step}},$$

either $V_{step}$ or $T_{step}$ can be changed in order to obtain a different pitch (gradient) of the stepped voltage waveform.

During $T_4$~$T_{15}$, the switched damping circuit can be connected to the loop by turning off (opening) $S_{d1}$ and $S_{d2}$ to damp a possible LC resonance.

Aspects of the present disclosure are set out in the following alphanumerically ordered clauses.

A1. Voltage waveform generator (207, 707, 1107, 1207) for a plasma assisted processing apparatus, the voltage waveform generator comprising an output node (510), a switch node (511) electrically coupled to the output node, and a multilevel voltage source converter (501, 1101) coupled to the switch node, wherein the voltage waveform generator is configured to generate a tailored voltage waveform (402) at the output node, wherein the tailored voltage waveform comprises a first portion (405) having a negative voltage slope, characterised in that the multilevel voltage source converter is configured to apply a sequence of monotonically descending voltage levels at the switch node, each of the voltage levels being applied for a respective predetermined time period ($T_{step}$) such that a pitch defined by the voltage levels and the respective predetermined time periods corresponds with the negative voltage slope thereby obtaining the first portion of the tailored voltage waveform at the output node.

A2. Voltage waveform generator of clause A1, wherein the negative voltage slope is constant and wherein the pitch is constant across the sequence of monotonically descending voltage levels.

A3. Voltage waveform generator of clause A1 or A2, wherein the multilevel voltage source converter is configured to output a plurality of different voltage levels being integer multiples of a voltage step ($V_{step}$), such that a difference between consecutive voltage levels of the sequence of monotonically descending voltage levels is constant and equal to the voltage step.

A4. Voltage waveform generator of any one of the clauses A1-A3, wherein the respective predetermined time periods ($T_{step}$) are identical throughout the sequence.

A5. Voltage waveform generator of any one of the clauses A1-A4, wherein the multilevel voltage source converter is configured to output at least three different voltage levels.

A6. Voltage waveform generator of clause A5, wherein the multilevel voltage source converter is a switched mode power converter configured to have redundant switching states to obtain the at least three voltage levels.

A7. Voltage waveform generator of clause A6, wherein the multilevel voltage source converter comprises at least one non-isolated DC/DC converter and a plurality of DC-link capacitors corresponding with at least part of the at least three voltage levels.

A8. Voltage waveform generator of any one of the clauses A1-A7, wherein the multilevel voltage source converter comprises a T-type converter (1111) in series with at least one H-bridge cell (1112).

A9. Voltage waveform generator of clause A8, further comprising a first DC voltage source (1108) and a second DC voltage source (1109) connected in series, wherein a negative terminal of the second DC voltage source (1109) is connected to a first node and a positive terminal of the second DC voltage source is connected to a midpoint node and wherein a negative terminal of the first DC voltage source (1108) is connected to the midpoint node and a positive terminal of the first DC voltage source is connected to a second node, wherein the T-type converter is connected to a the first node, the second node and to the midpoint node, preferably wherein the midpoint node is configured to be connected to a permanent earth (1103).

A10. Voltage waveform generator of clause A9, wherein the second DC voltage source (1109) is configured to output a first voltage level ($k_1V_{step}$) and the at least one H-bridge cell (1112) is configured to output a respective second voltage level ($k_2V_{step}$), wherein a ratio of the first voltage level and the second voltage level is a fraction of positive integer numbers.

A11. Voltage waveform generator of any one of the clauses A1-A10, further comprising a filter inductor (1104) coupled between the switch node and the output node.

A12. Voltage waveform generator of any one of the clauses A1-A11, further comprising a clamping node (511) between the switch node and the output node, and a voltage clamping circuit (1105) coupled to the clamping node and configured to clamp a maximum voltage and/or a minimum voltage at the clamping node.

A13. Voltage waveform generator of any one of the clauses A1-A12, further comprising a blocking capacitor (1102) coupled to the output node and configured to apply a voltage offset.

A14. Voltage waveform generator of any one of the clauses A1-A13, further comprising a switched damping circuit coupled to the output node and configured to limit a transient current.

A15. Voltage waveform generator of any one of the clauses A1-A14, wherein the tailored voltage waveform further comprises a second portion consisting of a positive voltage pulse, wherein the multilevel voltage source converter is further configured to generate the positive voltage pulse.

A16. Voltage waveform generator of clause A15 in conjunction with clause A9 or clause A10, wherein the multilevel voltage source converter is configured to generate the positive voltage pulse by connecting the first DC voltage source (1108) to the switch node (511).

A17. Voltage waveform generator of any one of the clauses A1-A16, comprising a control unit (115), wherein the control unit is configured to control operation of the multilevel voltage source converter to generate the sequence, preferably wherein the control unit comprises a current measurement unit (119) and/or a voltage measurement unit (116) configured to sense a respective current and/or voltage at the output node (510).

A18. Apparatus for plasma assisted processing of a dielectric substrate, comprising:

- a plasma generator
- a processing platform configured to support the dielectric substrate, and
- the voltage waveform generator of any one of the clauses A1-A17, wherein the output node is connected to the processing platform.

B1. Method of generating a tailored voltage waveform for plasma assisted processing of a substrate, wherein the tailored voltage waveform comprises a first portion having a negative voltage slope, characterised in that the first portion is obtained by:

- applying a sequence of monotonically descending voltage levels to a switch node, each voltage level being applied for a respective predetermined time period ($T_{step}$) such that the voltage levels and the respective predetermined time periods define a pitch corresponding with the negative voltage slope,
- electrically coupling the switch node to an output node to obtain the first portion of the tailored voltage waveform.

B2. Method of clause B1, wherein the negative voltage slope is constant in the first portion and wherein the pitch is constant across the sequence of monotonically descending voltage levels.

B3. Method of clause B1 or B2, wherein the sequence of monotonically descending voltage levels has a constant voltage step ($V_{step}$).

B4. Method of any one of the clauses B1-B3, wherein the respective predetermined time periods are identical throughout the sequence.

B5. Method of any one of the clauses B1-B4, comprising processing the sequence of monotonically descending voltage levels between the switch node and the output node through one or more of: a filtering inductor, a voltage clamping, a signal damping and a voltage bias.

B6. Method of plasma assisted processing of a dielectric substrate, the method comprising:

- arranging the dielectric substrate on a processing table,
- generating a tailored voltage waveform according to the method of any one of the clauses B1-B5,
- generating a plasma to produce ions,
- applying the tailored voltage waveform to the processing table to control an energy of the ions at an exposed surface of the dielectric substrate,
- wherein the first portion is applied while the ions are impinging on the exposed surface.

B7. Method of clause B6, wherein the sequence of monotonically descending voltage levels starts at a first voltage level defined by a predefined ion energy at the exposed surface.

B8. Method of clause B6 or B7, wherein the pitch is selected so as to maintain a voltage potential at the exposed surface constant while the ions are impinging on the exposed surface.

B9. Method of any one of clauses B6 to B8, wherein the tailored voltage waveform further comprises a second portion consisting of a positive voltage pulse.

B10. Method of clause B9, wherein the tailored voltage waveform comprises multiple sequences of the positive voltage pulse and the decreasing voltage slope.

The invention claimed is:

1. A voltage waveform generator for a plasma assisted processing apparatus, the voltage waveform generator comprising:

- an output node,
- a switch node electrically coupled to the output node, and
- a multilevel voltage source converter coupled to the switch node,
  - wherein the voltage waveform generator is configured to generate a tailored voltage waveform at the output node,
  - wherein the tailored voltage waveform comprises a first portion having a negative voltage slope,
  - wherein the multilevel voltage source converter is configured to apply a sequence of monotonically descending voltage levels at the switch node, each of the voltage levels being applied for a respective predetermined time period such that a pitch defined by the voltage levels and the respective predetermined time periods corresponds with the negative voltage slope to obtain the first portion of the tailored voltage waveform at the output node, and
  - wherein the multilevel voltage source converter comprises a T-type converter in series with at least one H-bridge cell.

2. The voltage waveform generator of claim 1, wherein the negative voltage slope is constant and wherein the pitch is constant across the sequence of monotonically descending voltage levels.

3. The voltage waveform generator of claim 1, wherein the multilevel voltage source converter is configured to output a plurality of different voltage levels being integer multiples of a voltage step, such that a difference between consecutive voltage levels of the sequence of monotonically descending voltage levels is constant and equal to the voltage step.

4. The voltage waveform generator of any claim 1, wherein the respective predetermined time periods are identical throughout the sequence.

5. The voltage waveform generator of claim 1, wherein at least one of the at least one H-bridge cell comprises a DC-link capacitor.

6. The voltage waveform generator of claim 1, wherein the at least one H-bridge cell comprises a plurality of H-bridge cells cascaded between the T-type converter and the switch node.

7. The voltage waveform generator of claim 6, wherein the plurality of H-bridge cells are configured to have a plurality of switching states delivering associated voltage values, wherein at least one of the plurality of switching states is a redundant switching state delivering a same voltage value as another one of the plurality of switching states.

8. The voltage waveform generator of claim 1, wherein the T-type converter comprises at least one non-isolated DC/DC converter.

9. The voltage waveform generator of claim 1, further comprising a first DC voltage source and a second DC voltage source connected in series, wherein a negative terminal of the second DC voltage source is connected to a first node and a positive terminal of the second DC voltage source is connected to a midpoint node and wherein a negative terminal of the first DC voltage source is connected to the midpoint node and a positive terminal of the first DC voltage source is connected to a second node, wherein the T-type converter is connected to the first node, the second node and to the midpoint node.

10. The voltage waveform generator of claim 9, wherein the second DC voltage source is configured to output a first voltage level and the at least one H-bridge cell is configured to output a respective second voltage level, wherein a ratio of the first voltage level and the second voltage level is a fraction of positive integer numbers.

11. The voltage waveform generator of claim 1, further comprising a filter inductor coupled between the switch node and the output node.

12. The voltage waveform generator of claim 1, further comprising a clamping node between the switch node and the output node, and a voltage clamping circuit coupled to the clamping node and configured to clamp a maximum voltage and/or a minimum voltage at the clamping node.

13. The voltage waveform generator of claim 1, further comprising a blocking capacitor coupled to the output node and configured to apply a voltage offset.

14. The voltage waveform generator of claim 1, further comprising a switched damping circuit coupled to the output node.

15. The voltage waveform generator of claim 14, wherein the switched damping circuit comprises a power switch in parallel with a dissipative element.

16. The voltage waveform generator of claim 1, wherein the tailored voltage waveform further comprises a second portion consisting of a positive voltage pulse, wherein the positive voltage pulse comprises a voltage ramp up to a positive voltage level followed by a voltage ramp down to an initial voltage level, and wherein the negative voltage slope of the first portion starts from the initial voltage level.

17. The voltage waveform generator of claim 16, wherein the multilevel voltage source converter is further configured to generate the positive voltage pulse.

18. The voltage waveform generator of claim 17, further comprising a first DC voltage source and a second DC voltage source connected in series, wherein a negative terminal of the second DC voltage source is connected to a first node and a positive terminal of the second DC voltage source is connected to a midpoint node and wherein a negative terminal of the first DC voltage source is connected to the midpoint node and a positive terminal of the first DC voltage source is connected to a second node, wherein the T-type converter is connected to the first node, the second node and to the midpoint node, wherein the multilevel voltage source converter is configured to generate the positive voltage pulse by connecting the first DC voltage source to the switch node.

19. The voltage waveform generator of claim 1, further comprising a control unit, wherein the control unit is configured to control operation of the multilevel voltage source converter to generate the sequence, preferably wherein the control unit comprises a current measurement unit and/or a voltage measurement unit configured to sense a respective current and/or voltage at the output node.

20. An apparatus for plasma assisted processing of a dielectric substrate, the apparatus comprising:

a plasma generator a processing platform configured to support the dielectric substrate, and the voltage waveform generator of claim 1, wherein the output node is connected to the processing platform.

* * * * *